(12) United States Patent
Burger

(10) Patent No.: US 7,703,480 B1
(45) Date of Patent: Apr. 27, 2010

(54) COMPOSITE TUBES AND METHOD OF MANUFACTURING SAME

(75) Inventor: George W. Burger, Rocklin, CA (US)

(73) Assignee: Hillerich & Bradsby Co., Louisville, KY (US)

( * ) Notice: Subject to any disclaimer, the term of this patent is extended or adjusted under 35 U.S.C. 154(b) by 425 days.

(21) Appl. No.: 11/194,178

(22) Filed: Aug. 1, 2005

(51) Int. Cl.
*F16L 11/00* (2006.01)

(52) U.S. Cl. .................. 138/129; 138/130; 138/150; 138/154

(58) Field of Classification Search ............... 138/129, 138/130, 137, 140, 139
See application file for complete search history.

(56) References Cited

U.S. PATENT DOCUMENTS

| | | | | |
|---|---|---|---|---|
| 3,773,088 A * | 11/1973 | Ball | .......................... | 138/129 |
| 4,019,539 A * | 4/1977 | Hoffmann et al. | .......... | 138/118 |
| 4,137,949 A * | 2/1979 | Linko et al. | ................. | 138/125 |
| 4,172,175 A | 10/1979 | Pearson et al. | ............. | 428/376 |
| 4,239,064 A * | 12/1980 | Gilman | ....................... | 138/154 |
| 4,273,601 A | 6/1981 | Weingart | .................... | 156/189 |
| 4,645,553 A * | 2/1987 | Languillat | ................... | 156/153 |
| 4,923,541 A | 5/1990 | Burger | ........................ | 156/87 |
| 5,131,325 A * | 7/1992 | Blauvelt | ..................... | 101/375 |
| 5,758,694 A * | 6/1998 | Friedrich et al. | ........... | 138/144 |
| 5,904,803 A | 5/1999 | Hillerich, III et al. | ....... | 156/494 |
| 6,007,439 A | 12/1999 | MacKay, Jr. | ................ | 473/520 |
| 6,139,451 A | 10/2000 | Hillerich, III et al. | ....... | 473/564 |
| 6,889,716 B2 * | 5/2005 | Lundberg et al. | ........... | 138/130 |
| 2007/0119512 A1 * | 5/2007 | Rytter | ........................ | 138/126 |

* cited by examiner

*Primary Examiner*—Patrick F Brinson
(74) *Attorney, Agent, or Firm*—Alexander P. Brackett; Middleton Reutlinger

(57) ABSTRACT

A method of fabricating a composite tubular member includes providing a mandrel having a central longitudinal axis and wrapping a plurality of composite fiber layers around said mandrel wherein the longitudinal axis thereof is oriented at a first angle with respect to the longitudinal axis of said mandrel. The composite tubular member produced does not have any longitudinal seams and is thus considerably stronger and more durable than prior art composite tubes.

10 Claims, 4 Drawing Sheets

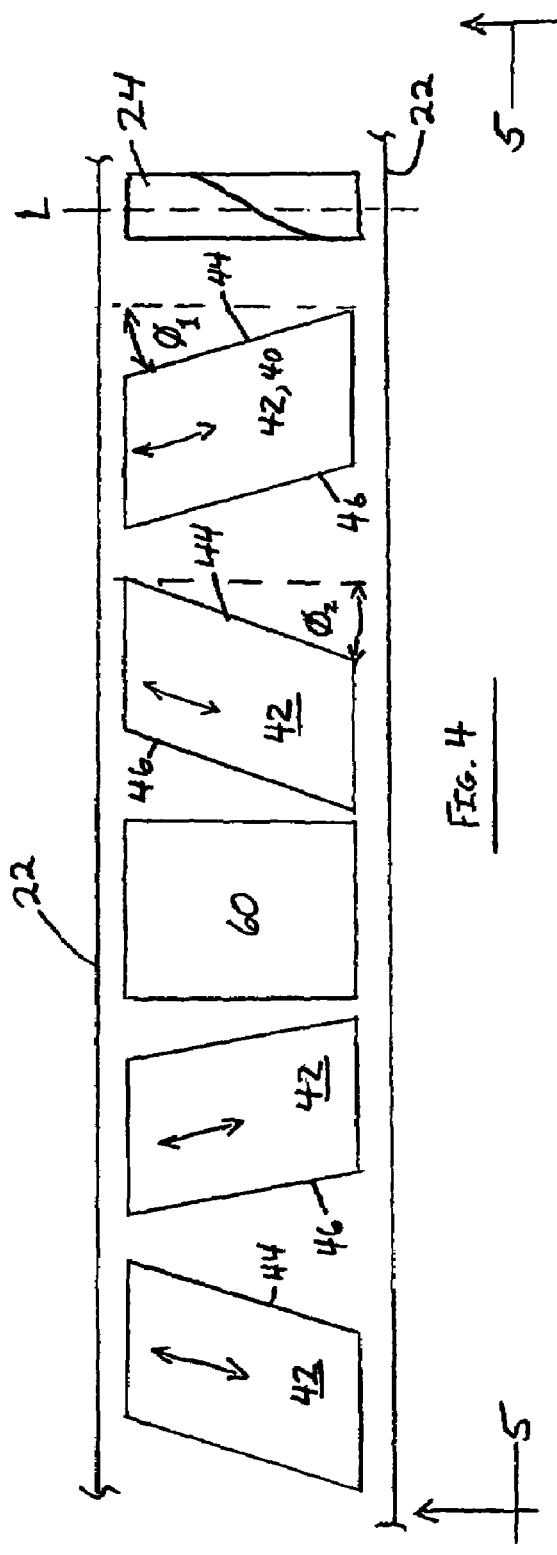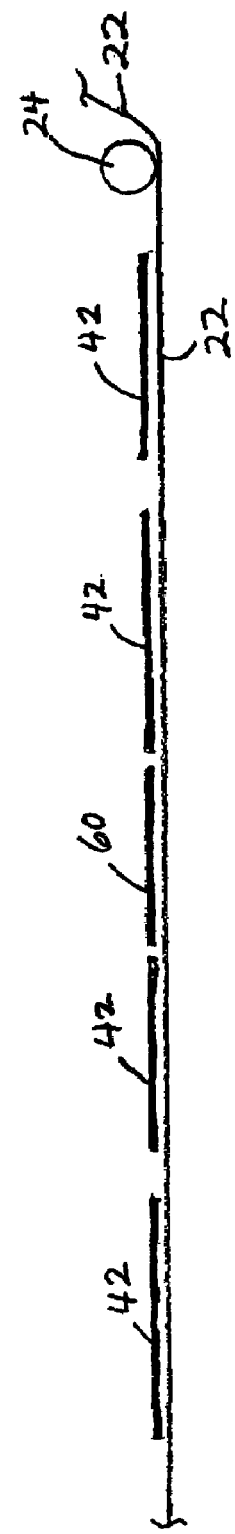

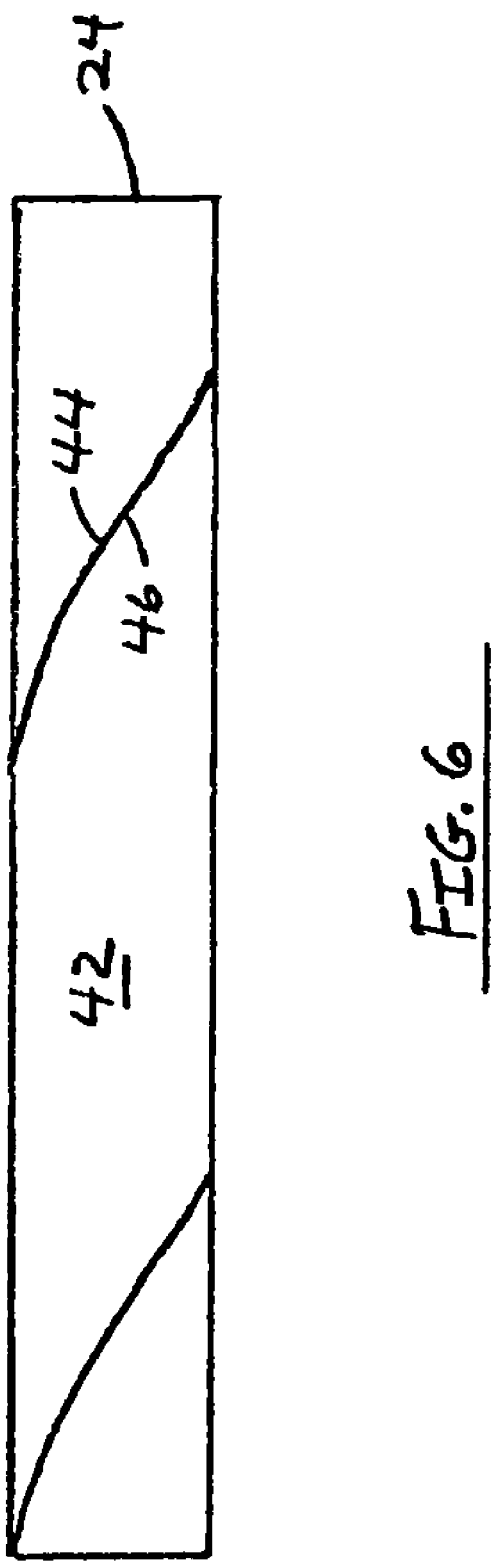

COMPOSITE TUBES AND METHOD OF MANUFACTURING SAME

FIELD OF THE INVENTION

The present invention relates generally to a process of making tubular members such as masts, poles and bat barrels and specifically to making a multi-layer tubular member comprising advanced composite materials that is highly resistant to impact-related failure.

BACKGROUND OF THE INVENTION

Various methods are known in the art for manufacturing high strength composite fiber tubular members. Many of these methods involve the use of a filament winding apparatus that is typically complex and costly, as well as limited in manufacturing capacity. U.S. Pat. No. 4,172,175 to Pearson and U.S. Pat. No. 4,273,601 to Weingart are examples of prior art filament winding tube manufacturing processes.

Additionally, methods of manufacturing tubular members using a conveying sheet disposed around a mandrel have been developed to obviate the need for costly winding equipment. U.S. Pat. No. 4,923,541 to Burger, incorporated herein by reference, discloses a method and apparatus for manufacturing composite tubes comprising wrapping various material layers around a mandrel utilizing a conveying sheet to accurately and evenly wrap said layers.

One difficulty with the prior art methods and the tubes produced thereby is that the composite fiber layers wrapped around the mandrel typically have seams that are generally parallel to a longitudinal axis of the mandrel. Furthermore, the fibers inherent in a wide variety of composite materials are often oriented generally parallel to the longitudinal axis of the mandrel. This arrangement of seams and composite fibers causes inherent weak points along the longitudinal seams, particularly in composite tubes that are subject to repeated impact, such as those used in the manufacture of baseball bats and the like.

Accordingly, there is a need in the art for a multi-layer composite fiber tubular member and a method of making such a tube that is devoid of longitudinal seams along its length.

SUMMARY OF THE INVENTION

The present invention provides a multi-layer composite tubular member that is capable of withstanding repeated impacts without failure. The invention provides a method for producing such a tubular member that utilizes a plurality of composite fiber layers that are wrapped around a mandrel or similar tubular element such that the fiber direction is arranged at an oblique angle to a longitudinal axis of said mandrel. This layer arrangement prevents longitudinal seams along the tubular member and provides a finished tube having superior strength and durability.

Other objects and features of the present invention will become apparent upon reading the detailed description of the preferred embodiment(s) taken in conjunction with the drawing Figures.

DETAILED DESCRIPTION OF THE DRAWING FIGURES

FIG. 4 is a view of an exemplary arrangement of composite layers on a rolling sheet in accordance with one embodiment of the present invention taken along the line 4-4 of FIG. 2.

FIG. 5 is a view of an exemplary arrangement of composite layers taken along the line 5-5 of FIG. 4.

FIG. 6 is a view of a seam arrangement in a finished tube in accordance with one embodiment of the present invention.

DETAILED DESCRIPTION OF THE PREFERRED EMBODIMENT(S)

Figure 1:
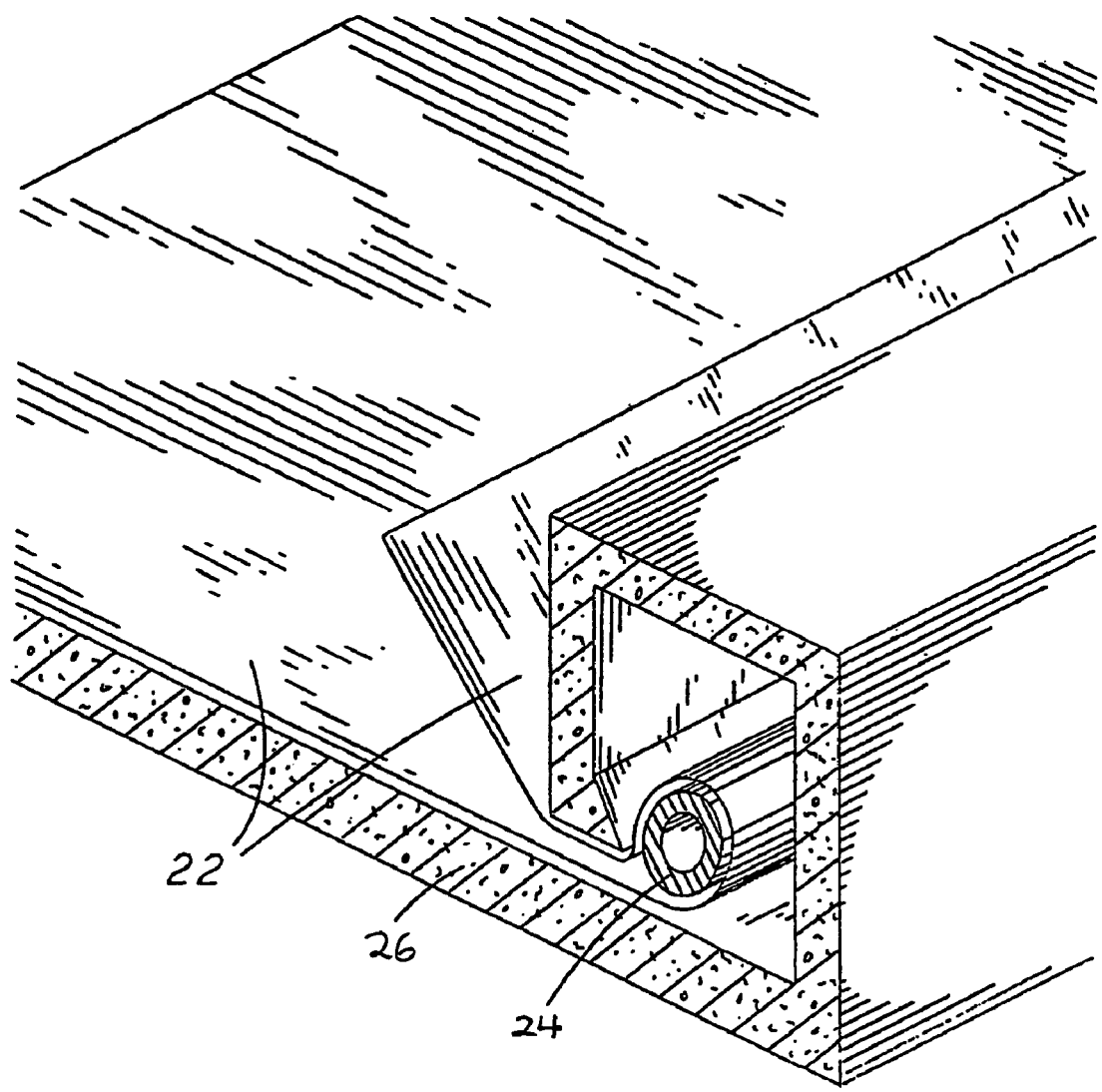
FIG. 1 is an isometric view of an apparatus for production of composite tubes in accordance with one embodiment of the present invention.

Referring now to drawing Figures, and in accordance with a preferred constructed embodiment of the present invention, an apparatus 20 for rolling a composite tubular member 10 includes a conveying sheet 22 which may comprise a material such as Mylar® polyester film available from E.I. DuPont de Nemours & Co., or alternatively any relatively strong fabric suitable to come into contact with composite material. Conveying sheet 22 is disposed around at least a portion of a mandrel 24 that is generally cylindrical in shape and may be enclosed within a frame 26 that impedes mandrel 24 from any substantial lateral motion as conveying sheet 22 is pulled from either end around mandrel 24. In other words, frame 26 permits mandrel 24 to float so that it rotates when conveying sheet 22 is pulled around it, but it is prohibited from rolling away by frame 26.

Figure 2:
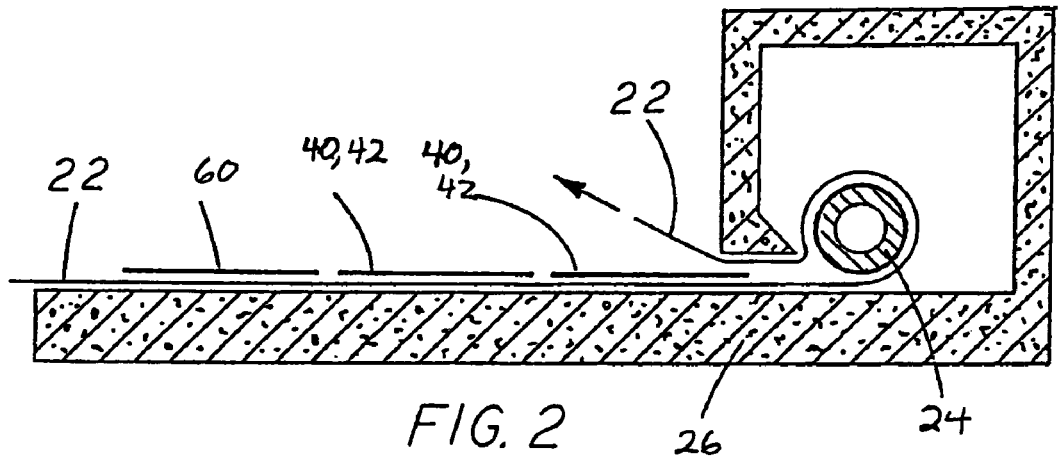
FIG. 2 is an elevation view of an apparatus for production of composite tubes in accordance with one embodiment of the present invention.
Figure 3:
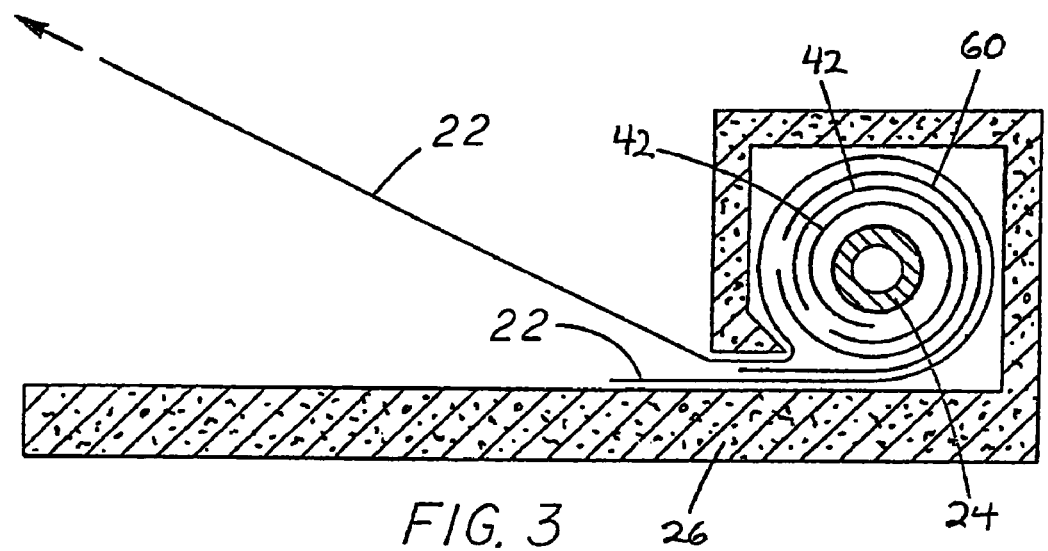
FIG. 3 is an elevation view of an apparatus for production of composite tubes in accordance with one embodiment of the present invention.

As best seen in FIGS. 2-4, a suitable composite material 40 comprising a plurality of fibers is arranged on conveying sheet 22 adjacent mandrel 24, in a plurality of layers 42. The conveying sheet 22 is then pulled in the direction of the arrow shown in FIG. 3 to advance sheet 22 around mandrel 24, thus advancing layers 42 toward and around mandrel 42 as sheet 22 continues to be pulled. Composite material 40 may comprise one of many commercially available composite fabrics, for example graphite fabric pre-impregnated with epoxy resin, often called "pre-preg" in the art. Furthermore, composite layers 42 can be cut from a larger portion of composite material 40, and may have a wide variety of shapes and sizes, as will be discussed in greater detail herein below.

As seen in FIGS. 4 and 5 composite layers 42 may be arranged so that the direction of their fibers, as denoted by the arrows, are at an oblique angle with respect to a longitudinal axis of mandrel 24, shown in FIG. 4 as line L. The layer 42 nearest to mandrel 24 has a leading edge 44 at a first angle $Ø_1$ with respect to a longitudinal axis of mandrel 24. The succeeding layer 42 is then arranged so that its leading edge 44 is at an angle $Ø_2$ that is complementary to $Ø_1$. By arranging alternate layers 42 in this fashion, once they are wrapped around mandrel 24 the seams defined by trailing edges 46 of composite layers 42 describe a generally helical path around mandrel 24 such that no longitudinal seams are present in a finished tube 10. Arranging alternate layers 42 such that they are disposed at complementary angles with respect to mandrel 24 axis provides a finished tube having a balanced lay-up, which is desirable in many manufacturing applications.

Again referring to FIG. 4 there is shown a release layer 60 disposed between a pair of composite layers 42 which functions to inhibit adhesion between composite layers 42, thereby permitting the manufacture of a tubular member 10 comprised of a plurality of concentric tubes, each separated by a release layer 60. This feature of the present invention is particularly useful for making modern composite bats that utilize concentric tubular construction. It should be noted that the orientation of release layer 60 on conveying sheet 22 is of no consequence in the present invention, since release layer 60 does not enhance the strength of tube 10. Release layers 60 can be comprised of any relatively thin material that prevents adhesion between adjacent composite layers.

In one embodiment of the present invention, a plurality of composite layers 42 may be arranged on conveying sheet 22 at a plurality of angles, as long as the composite fiber direction is not generally parallel to a longitudinal axis of mandrel 24. This permits the manufacture of high strength tubular members 10, even when employing irregular shapes for composite layers 42. Stated another way, in the present embodiment of the invention the orientation of composite layers 42 is only limited in that the composite fiber direction can not be substantially parallel to a longitudinal axis of mandrel 24. This orientation of composite layers 42 and concomitant fiber orientation prohibits longitudinal fiber orientation, thereby enhancing strength of tubular member 10.

In a yet further embodiment of the present invention, layers 42 are shaped substantially as parallelograms having an overall length sufficient to produce a tubular member 10 of desired length. The layers 42 may be arranged on conveying sheet 22 such that their leading edges 44 are at oblique angles to a longitudinal axis of mandrel 24 so that once wrapped, there are no longitudinal seams resulting from said layers 42 in tubular member 10.

As will be readily understood by one of ordinary skill in the art, there may be some overlap or underlap such that trailing edge 46 is disposed over leading edge 44 when the layer 42 is wrapped around mandrel 24, or alternatively trailing edge 46 does not wrap far enough around mandrel 24 to meet leading edge 44, depending upon the overall shape and size of layers 42. In one embodiment of the present invention composite layers 42 are shaped and sized such that the leading edge 44 thereof meets or abuts trailing edge 46 once each layer 42 is wrapped around mandrel 42. In this embodiment of the present invention each succeeding layer 42 must be sized slightly larger than the preceding layer in order to compensate for the enhanced diameter of the mandrel 24 as each layer 42 is wrapped. This feature of the present invention provides for a finished tubular member that has very little variance in circumference, since there are no overlapping or underlapping layers 42.

In one alternative embodiment of the present invention layers 42 are provided in shapes that have a longitudinal axis, said layers 42 being arranged on conveying sheet 22 such that the longitudinal axis of layer 42 is at an oblique angle with respect to a longitudinal axis of mandrel 24, said angle being any angle other than zero or ninety degrees to prevent longitudinal seams in the finished tube 10.

Once a sufficient number of composite layers 42 and release layers 60 (where desired) are wrapped around mandrel 24 to produce a tube 10 of desired diameter, the tubular member can then be cured utilizing conventional internal bladder pressurization techniques and/or further manipulated to provide certain surface finishes using external molds. It should also be noted that the present invention is readily employed to produce a tubular member 10 having a plurality of different diameters, since additional layers 42 may be provided along a portion or portions of mandrel 24 to enhance tube diameter in those areas.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A composite tube comprising:
    a plurality of composite material layers comprising epoxy-impregnated fabric, each having a longitudinal axis and a plurality of fibers therein aligned generally with said longitudinal axis, said layers each having a leading and trailing edges disposed generally parallel to said longitudinal axes and generally parallel to each other, said layers arranged to form a tube, wherein the leading edge, trailing edge, and longitudinal axis of each of said layers is arranged to describe a generally helical path around a longitudinal axis of said tube.

2. A composite tube as claimed in claim 1 further comprising:
    a release layer disposed between of pair of said plurality of layers.

3. A composite tube as claimed in claim 1 further comprising:
    a plurality of release layers, wherein each of said release layers is disposed between a pair of said plurality of layers.

4. A composite tube as claimed in claim 1 wherein each of said layers is sized so that the trailing edges thereof abut the leading edges thereof when each layer is arranged to form a tube.

5. A composite tube as claimed in claim 4 further comprising:
    a release layer disposed between a pair of said plurality of layers.

6. A composite tube as claimed in claim 1 wherein each successive composite layer is arranged such that its fibers are at a complementary angle to the fibers of the prior composite layer thereof.

7. A composite tube as claimed in claim 4 wherein each successive composite sheet layer is arranged such that its fibers are at a complementary angle to the fibers of the prior composite layer thereof.

8. A composite tube as claimed in claim 1 wherein each composite layer is generally shaped as a parallelogram.

9. A composite tube as claimed in claim 4 where each composite layer is generally shaped as a parallelogram.

10. A composite tube comprising:
    a plurality of composite material layers comprising epoxy-impregnated fabric having a plurality of fibers therein aligned generally at a first angle with respect to said longitudinal axis, said layers each having leading and trailing edges aligned generally at a second angle to said longitudinal axes wherein said first angle and said second angle are complementary; and
    wherein said layers are arranged to form a tube.

* * * * *